Dec. 20, 1955  J. J. KUHN, JR., ET AL  2,727,308
PLOTTING ARM
Filed Dec. 6, 1951  4 Sheets-Sheet 1
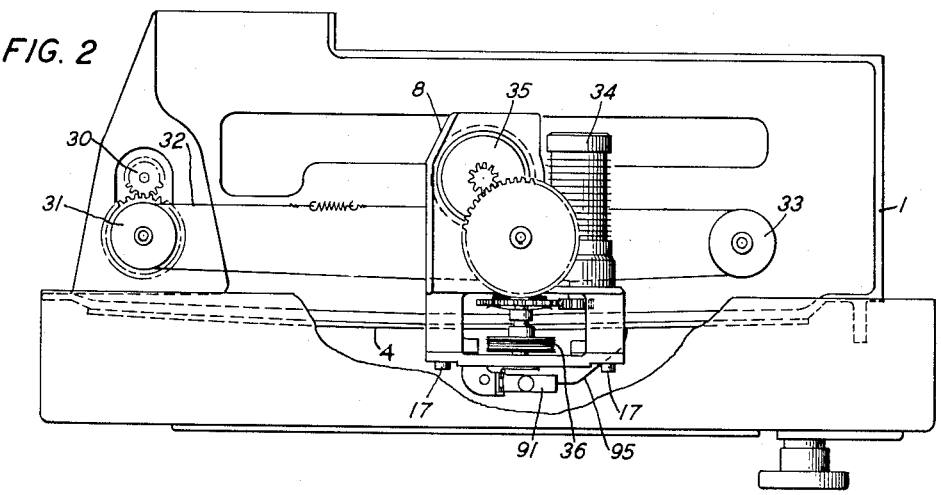
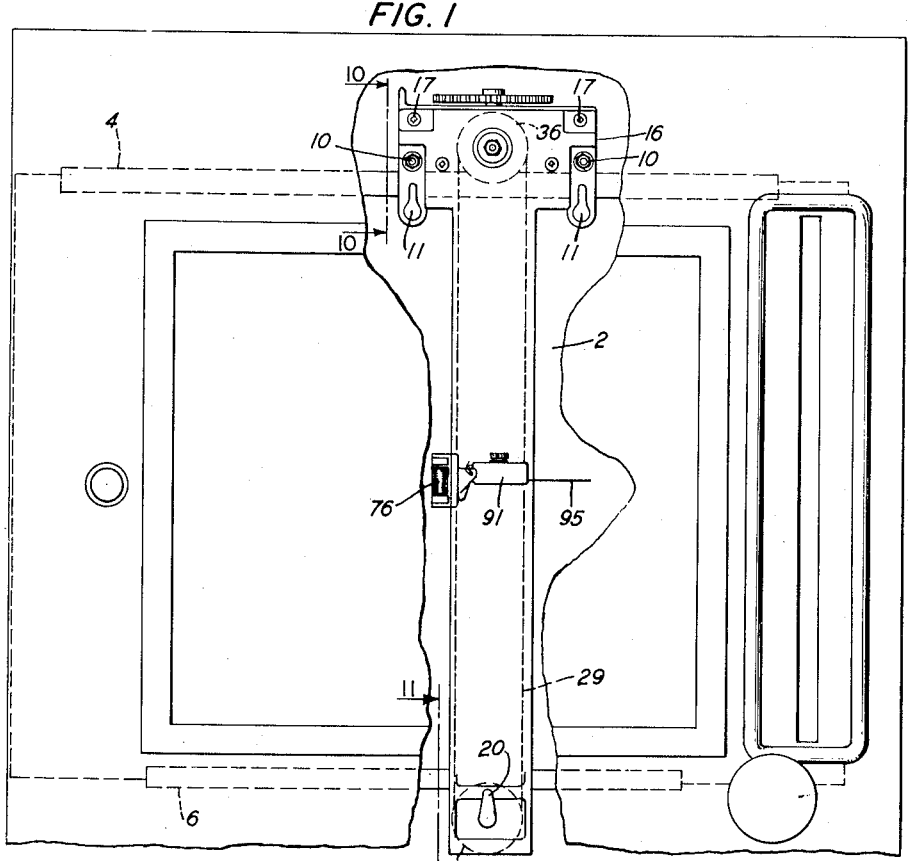
INVENTORS J. J. KUHN, JR.
A. B. WATROUS
BY
ATTORNEY Dec. 20, 1955    J. J. KUHN, JR., ET AL    2,727,308
PLOTTING ARM
Filed Dec. 6, 1951    4 Sheets-Sheet 2
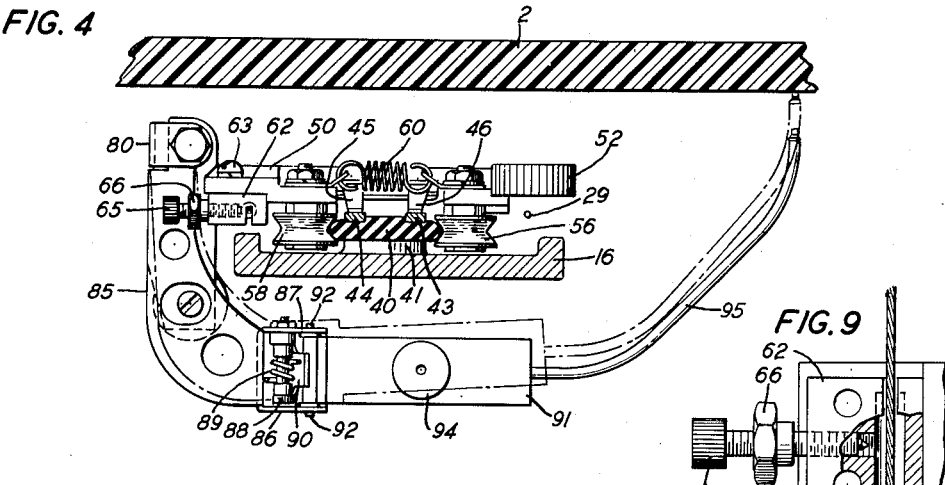
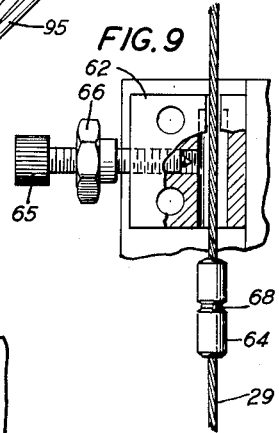
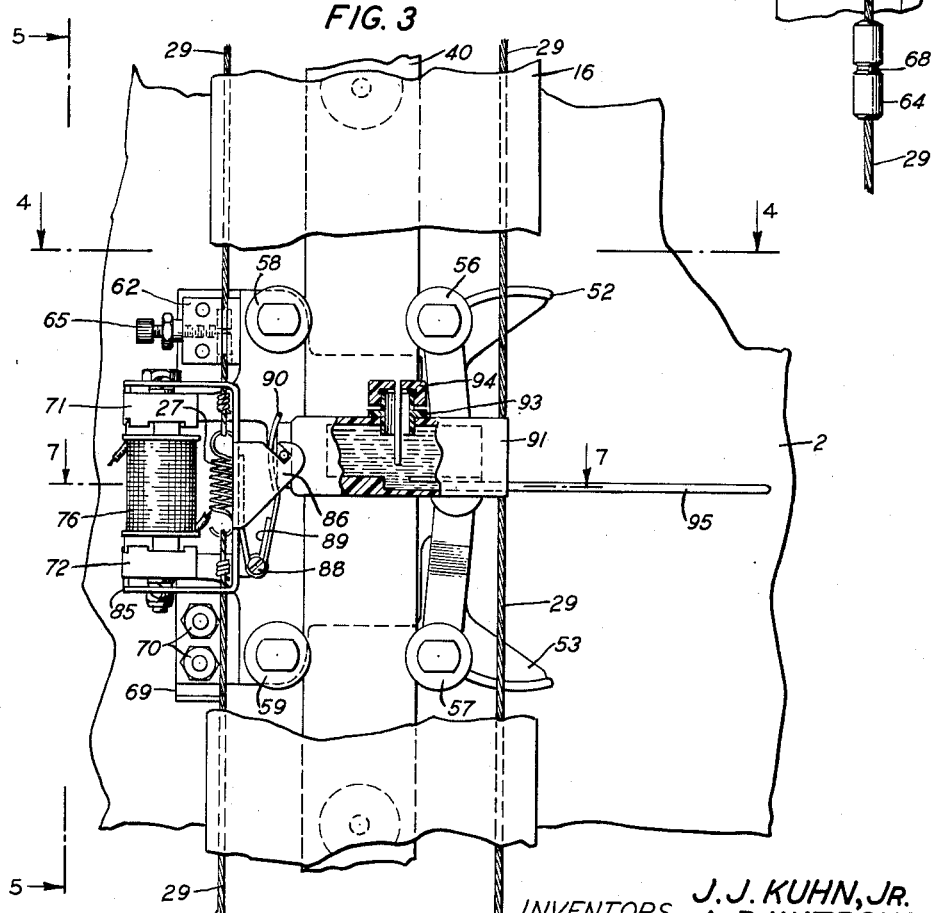
INVENTORS J. J. KUHN, JR.
BY A. B. WATROUS
ATTORNEY Dec. 20, 1955     J. J. KUHN, JR., ET AL     2,727,308
PLOTTING ARM
Filed Dec. 6, 1951     4 Sheets-Sheet 3

INVENTORS J. J. KUHN, JR.
A. B. WATROUS
BY
*W. F. Dawson*
ATTORNEY

Dec. 20, 1955  J. J. KUHN, JR., ET AL  2,727,308
PLOTTING ARM
Filed Dec. 6, 1951 4 Sheets-Sheet 4
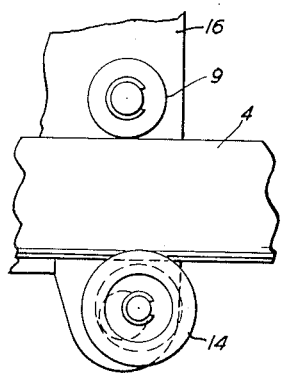
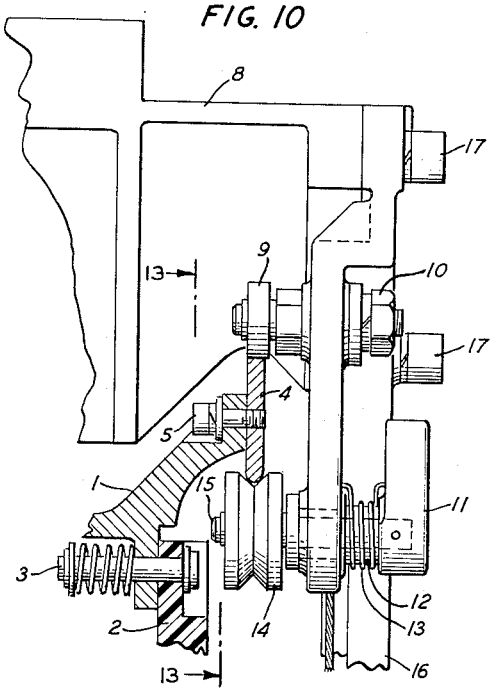
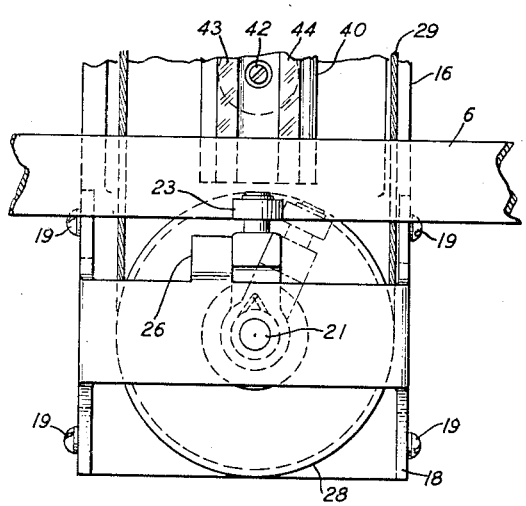
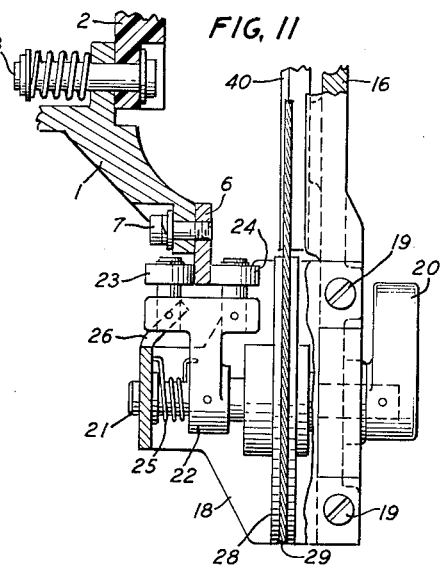
INVENTORS J. J. KUHN JR.
A. B. WATROUS
BY
W. H. Dawson
ATTORNEY

United States Patent Office 2,727,308
Patented Dec. 20, 1955

2,727,308

PLOTTING ARM

John J. Kuhn, Jr., Basking Ridge, and Albert B. Watrous, Morris Plains, N. J., assignors to Bell Telephone Laboratories, Incorporated, New York, N. Y., a corporation of New York Application December 6, 1951, Serial No. 260,136

5 Claims. (Cl. 33—18)

This invention relates to plotting boards and particularly to improvements in the pen carriage arms and pen carriages of such boards.

The object of the invention is a pen carriage arm and pen carriage which is easily removed from and replaced on the plotting board.

A feature of the invention is means for detachably mounting the pen carriage arm on the arm rails including spring loaded, eccentrically mounted, ball bearing rollers.

Another feature of the invention is an insulating rail mounted on the pen carriage arm and supporting conducting strips.

A further feature of the invention is means for detachably mounting the pen carriage on the insulating rail including spring loaded ball bearing rollers.

Another feature of the invention is means for coupling the pen carriage to the drive cable so that the carriage may easily be detached and replaced without disturbing the location of the pen on the plotting surface.

Other features and advantages of the invention will be apparent from the following description taken in connection with the drawings in which:

Fig. 1 shows a plan view of a plotting board embodying the invention;

Fig. 2 is a top view of the board shown in Fig. 1;

Fig. 3 is a front elevation in part section of the pen and pen carriage;

Fig. 4 is a top view in part section of the pen and pen carriage;

Fig. 9 is a detail view in part section of the drive cable coupler;

Fig. 10 is a side elevation in part section of the upper support of the pen carriage arm;

Fig. 11 is a side elevation in part section of the lower support of the pen carriage arm;

Fig. 12 is a partial rear elevation of the support shown in Fig. 11; and

Fig. 13 is a partial rear elevation of the support shown in Fig. 10.

Figure 6:
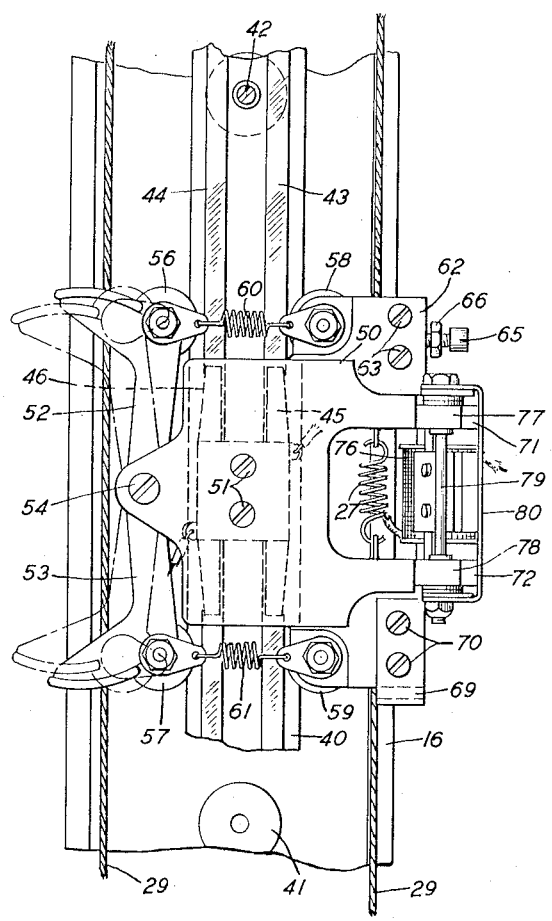
Fig. 6 is a rear elevation of the pen and pen carriage.
Figure 5:
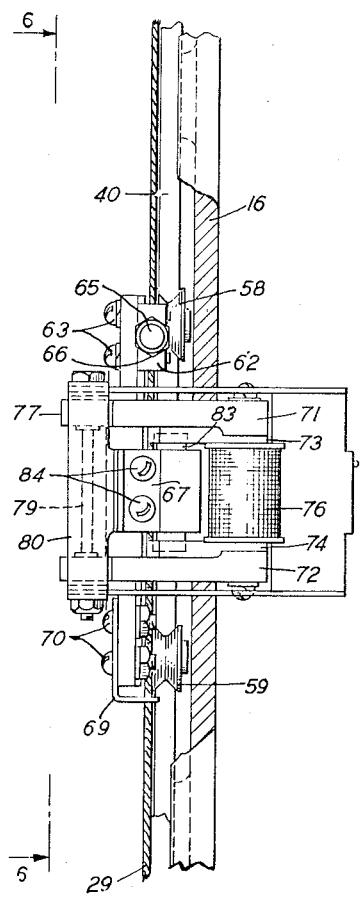
Fig. 5 is a side elevation of the pen and pen carriage.

In the present disclosure the invention is embodied in a plotting board having the plotting surface in a vertical plane but the invention may obviously be embodied in plotting boards having the plotting surface in other planes such as a horizontal plane.

The plotting board may have a main frame, such as the hollow box-like casting 1, which has an opening in the front and rear. As shown most clearly in Figs. 10 and 11, the plotting surface 2 covers the opening in the front of the frame 1 and is secured thereto as by the bolts 3, 3. An upper arm rail 4 is secured to the frame 1 by screws 5, 5; while a lower arm rail 6 is secured to the frame 1 by screws 7, 7. A pen carriage arm 16 to which is fastened a motor support 8 by means of screws 17, 17 is supported on the rail 4 by two ball bearing rollers 9 mounted on stub shafts journaled in the arm 16 and secured by nuts 10. While for convenience of manufacture, the motor support 8 and arm 16 have been shown as separate items secured together, it is obvious that these two elements may, if desired, be combined in one unitary element.

A lever 11 is mounted on a shaft 15 journaled in a bushing 12, mounted in the arm 16. The lever 11 is yieldingly retained in position by the spring 13 engaging holes in the arm 16 and the lever 11. A ball bearing roller 14 is mounted on a reduced portion of the shaft 15, eccentrically located with respect to the bushing 12. The shaft 15 may, as shown, be machined from one piece of metal or the reduced portion may be a separate short shaft secured in any suitable manner eccentrically to the other portion of the shaft. The roller 14 has a V surface engaging the rail 4 so that the motor support 8 and arm 16 assembly will be accurately positioned with respect to the rail 4. Due to the eccentricity of shaft 15 manual rotation of lever 11 will move the roller 14 out of engagement with the rail 4, and the motor support 8 and arm 16 assembly with all devices mounted thereon may be moved forward out of engagement with the rail 4. When the motor support 8 and arm 16 assembly is replaced in position and the lever 11 released, the spring 13 will force the roller 14 into engagement with the rail 4 and due to the V surface of the roller 14 the motor support 8 and arm 16 assembly will be accurately located with respect to the rail 4.

The pen carriage arm 16 extends across the plotting surface 2 and the lower rail 6. At the lower end of the arm 16 a U-shaped bracket 18 is secured to the arm 16 as by screws 19, 19 and extends rearwardly of the arm 16. A lever 20 is secured to a shaft 21 journaled in the arm 16, and in the rear surface of the bracket 18. A lever arm 22 is secured to shaft 21 and supports two ball bearing rollers 23, 24 normally in contact with opposite faces of the rail 6. The lever arm 22 is normally yieldingly pressed against a stop 26, formed in the bracket 18, by a spring 25 engaging holes in the bracket 18 and lever arm 22. Manual rotation of the lever 20 will rotate the lever arm 22 disengaging the rollers 23, 24 from the rail 6 thus releasing the lower end of arm 16 for removal. When the arm 16 is replaced the spring 25 presses the lever arm 22 against stop 26 retaining rollers 23, 24 in their normal position.

In Fig. 2 the servomotor 30 geared to the balancing potentiometer 31 drives the cable 32 which is secured in any suitable manner (not shown) to the motor support 8 and passes around the sheave 33 to laterally position the motor support 8 and pen carriage arm 16 assembly. The servomotor 34 mounted on the motor support 8 is geared to the balancing potentiometer 35 and the sheave 36 also mounted on the motor support 8. In prior plotting boards the servomotor 34 and potentiometer 35 were mounted at opposite ends of the pen carriage arm 16 but this arrangement was found to have a pendulum effect, reducing the accuracy of the plotted results. By placing the servomotor 34 and potentiometer 35 at the same end of the arm 16, this pendulum effect is eliminated and greater accuracy is secured. As the control of these servomotors forms no part of the present invention and is known to those skilled in the art, a detailed description of the control circuit is not required.

A sheave 28, Fig. 11, is rotatably mounted on the shaft 21 and carries the cable 29 which is composed of two sections, one end of each section being pinned to the web of sheave 36. The cable 29 passes from the sheave 28 longitudinally under one edge of the arm 16, over the sheave 36, Fig. 1, and longitudinally under the other edge of the arm 16. The usual spring or turnbuckle 27, Fig. 3, may be intercalated in the cable 29 to hold the cable tight on the sheaves 28, 36.

Figure 7:
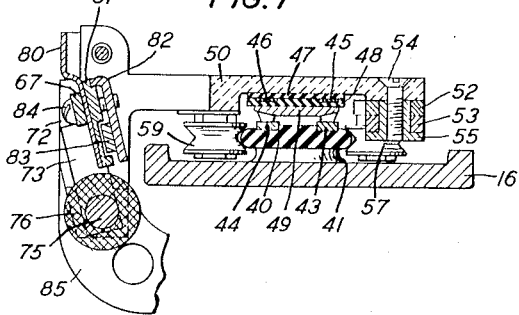
Fig. 7 is a sectional view along the line 7—7 of Fig. 3.

As shown in Figs. 6 and 7 an insulating rail 40 is secured to bosses 41 on the rear of the arm 16 by screws 42. The rail 40 may be formed of hard insulating plastic in which the conducting strips 43, 44 are molded, cemented or otherwise securely fastened. Two spring brushes 45, 46 interleaved with the insulators 47, 48 are secured to the body 50 of the pen carriage by the cover plate 49 and screws 51, 51 and contact the conducting strips 43, 44.

Two finger levers 52, 53 are rotatably secured by screw 54 and internally threaded sleeve 55 to an ear formed in the body 50 of the pen carriage. Grooved ball bearing rollers 56, 57 are respectively rotatably secured to the ends of the levers 52, 53. Grooved ball bearing rollers 58, 59 are rotatably secured to the body 50 preferably respectively in line with the rollers 56, 57. Spring 60 affixed to the mounting screws of rollers 56, 58 and spring 61 affixed to the mounting screws of rollers 57, 59 resiliently hold the rollers 56, 57, 58, 59 in contact with the rail 40. By pressing the levers 52, 53 back to the dotted position shown in Fig. 6, the rollers 56, 57 will be withdrawn from the rail 40 then by slightly displacing the body 50 the pen carriage may be removed. When the body 50 is replaced and the levers 52, 53 released, the springs 60, 61 draw the rollers 56, 57, 58, 59 into contact with the rail 40 and the grooved surfaces of the rollers accurately locate the pen carriage with respect to the rail 40.

A small block 62 is attached by screws 63, 63 to the body 50 of the pen carriage. The block 62 (Fig. 9) is longitudinally bored to receive the ferrule 64 and slotted to receive the cable 29. The ferrule 64 is sweated or otherwise secured to the cable 29. A screw 65 having a hardened point is threaded in the block 62 and may be secured by the locking nut 66. The cable 29 is placed in the slot in the block 62, the pen carriage is moved along the cable 29 to draw the ferrule 64 into the boring in the block 62 then the screw 65 is screwed inward until the point of the screw 65 engages the V groove 68 in the ferrule 64 accurately registering the position of the pen carriage with respect to the cable 29. A stop 69 adjustably secured to the body 50 by the screws 70, 70 defines the limit of travel of the pen carriage.

The body 50 is molded to form two right angled arms 71, 72 extending laterally and forwardly of the arm 16. Two small polepieces 73, 74 are seated in shallow recesses formed in the ends of the arms 71, 72. A magnetic core 75 surrounded by an electromagnet 76 is located between the pole-pieces 73, 74 and secured by screws 75, 76, passing through holes in the arms 71, 72 and polepieces 73, 74 and threaded in the core 75. The ends of the winding of electromagnet 76 are soldered to tabs formed in the brushes 45, 46 contacting the strips 43, 44 so that the electromagnet 76 may be energized by a source of current (not shown) connected to the strips 43, 44.

Figure 8:
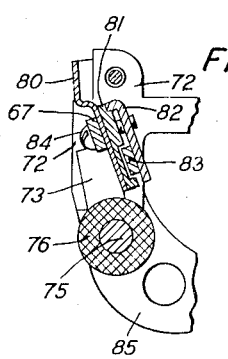
Fig. 8 is a partial view of Fig. 7 when the pen magnet is energized.

Two ears 77, 78 pierced by small holes are formed in the arms 71, 72 at the right angled portion and support a small shaft 79. Mounted on the shaft 79 is a U-shaped element of sheet metal 80 having a portion extending toward the electromagnet 76. Seated on this portion is a magnet seat 81 and cover plate 82 secured by screws 84, 84 to retain a permanent magnet 83 extending over the pole-pieces 73, 74. A soft iron bar 67 is also secured by the screws 84, 84 in position to concentrate the lines of magnetic force between the pole-pieces of the solenoid 76 and improve the operation of the pen carriage magnet. When the electromagnet 76 is not energized, the magnet 83 will be attracted to the pole-pieces 73, 74 as shown in Fig. 7; but when the electromagnet 76 is energized the field of the electromagnet 76 opposes the field of the magnet 83, repelling the magnet 83 and rotating the element 80 as shown in Fig. 8.

A U-shaped sheet metal member 85 is rotatably mounted on the shaft 79 and soldered or otherwise secured to the element 80 to rotate therewith. The free end of the member 85 is formed into two ears 86, 87, Fig. 4, having bayonet slots formed therein. A post 88 is bolted to an extension of the ear 87 and has a spring 89 coiled therearound. A sheet metal spring cover 90 is wrapped around the post 88 outside the spring 89, and is resiliently impelled outward by the spring 89.

A suitable type of pen may be mounted in the bayonet slots formed in the ears 86, 87. The pen shown in Figs. 3 and 4 has a molded or machined plastic ink reservoir 91 having studs 92, 92 secured thereto and adapted to engage the bayonet slots in the ears 86, 87. When the ink reservoir 91 is in place, the spring cover 90 is forced backward compressing spring 89. The ink reservoir 91 is resiliently retained in position but may be rotated about the studs 92, 92 by an external force. When the force is removed the spring 89 and cover 90 will restore the ink reservoir 91 to normal position. Thus if the pen 95 should strike an obstruction the ink reservoir 91 will rotate permitting the pen 95 to pass the obstruction and will then be restored to normal position. A nipple 93 is secured to the top of the ink reservoir 91 for filling the reservoir and is closed by a removable cap 94. The pen 95 is secured in a hole extending to a recess formed in the ink reservoir 91 and has a tip dimensioned to produce a line of the desired thickness.

Normally the magnet 83 rotates the members 80, 85 to hold the pen 95 clear of the paper so that no record is made of aimless movements of the pen 95. When a record is to be made the electromagnet 76 is energized to oppose the effect of magnet 83 rotating the members 80, 85 until the pen 95 is in contact with the plotting surface.

What is claimed is:

1. In a plotting board having a framework supporting a plotting surface located between two rails, a plotting arm adapted to be traversed along said rails adjacent to said surface, spring loaded rollers affixed to said arm and detachably contacting said rails, an insulated rail mounted on said arm, a pen carriage having a pen control electromagnet, spring loaded rollers affixed to the pen carriage and detachably contacting said insulated rail, conductive strips on said insulated rail adapted to connect said electromagnet to a control circuit, a servomotor and balancing potentiometer mounted on said arm adapted to be connected to a control circuit, a cable driven by said servomotor and supported by said arm, and a detachable self-registering connection between said carriage and said cable.

2. The combination in claim 1 in which said cable connection includes a grooved ferrule secured to the cable, a block secured to the pen carriage and bored to receive said ferrule, and a screw threaded in said block and having a pointed end adapted to engage the groove in said ferrule.

3. In a plotting board having a framework supporting a plotting surface between first and second rails, a plotting arm adapted to be traversed along said rails adjacent to said surface, ball bearing rollers rotatably secured to said arm and contacting one edge of said first rail, a first shaft journaled in said arm, a first lever secured to said first shaft, a first spring engaging said arm and said first lever, a grooved roller eccentrically mounted on said first shaft and normally engaging the other edge of said first rail whereby rotation of said first shaft by said first lever will disengage said grooved roller from said first rail, a second shaft journaled in said arm, a second lever secured to said second shaft, a third lever secured to said second shaft, a spring engaging said third lever and said arm, and a pair of rollers mounted on said third lever and normally contacting the sides of said second rail whereby rotation of said second shaft by said second lever will disengage said pair of rollers from said second rail.

4. In a plotting board having a framework supporting a vertical plotting surface located between two horizontal rails, a vertical plotting arm adapted to be traversed along said rails adjacent to said surface, spring loaded rollers affixed to said arm and detachably contacting said rails, a servomotor and balancing potentiometer mounted on one end of said arm and adapted to be connected to a control circuit, a vertical rail mounted on said arm, a plotting pen adapted to record on said surface, a pen carriage carrying said pen, spring loaded rollers affixed to said pen carriage and detachably contacting said vertical rail, a cable driven by said servomotor and detachably connected to said carriage, precision locating means associated with said cable and clamping means secured to said pen carriage, and cooperating with said locating means.

5. The combination with a plotting board having a framework supporting a plotting surface, an insulating rail supported by said framework, conducting strips mounted on said rail, a carriage mounted on said rail, driving means supported by said framework and adapted to be connected to a control circuit to move said carriage along said rail, recording means pivotably mounted on said carriage and adapted to mark said surface, a permanent magnet associated with said recording means and adapted to raise said recording means from said surface, and an electromagnet mounted on said carriage and adapted to be connected through said conducting strips to said control circuit to oppose the effect of said permanent magnet on said recording means.

References Cited in the file of this patent

UNITED STATES PATENTS

| Number | Name | Date |
|---|---|---|
| 842,144 | Gee | Jan. 22, 1907 |
| 858,254 | Benedict | June 25, 1907 |
| 1,149,120 | Fortune | Aug. 3, 1915 |
| 2,045,586 | Crowley | June 30, 1936 |
| 2,243,838 | Cunningham | June 3, 1941 |
| 2,322,653 | Mitchell | June 22, 1943 |
| 2,334,301 | Young | Nov. 16, 1943 |
| 2,422,025 | Luck | June 10, 1947 |
| 2,451,931 | Edelmann | Oct. 19, 1948 |
| 2,492,148 | Herbold | Dec. 27, 1949 |
| 2,549,403 | Weinberg | Apr. 17, 1951 |
| 2,569,328 | Omberg | Sept. 25, 1951 |